United States Patent
Ohie et al.

[15] 3,667,228
[45] June 6, 1972

[54] LUBRICATING CIRCUIT OF AN AUTOMOTIVE POWER TRANSMISSION

[72] Inventors: Koichi Ohie, Tokyo; Koji Enomoto, Yokohama, both of Japan

[73] Assignee: Nissan Motor Company, Limited, Yokohama, Japan

[22] Filed: Nov. 5, 1970

[21] Appl. No.: 87,072

[30] Foreign Application Priority Data

Nov. 12, 1969 Japan..................................44/90672

[52] U.S. Cl..............................................60/54, 60/DIG. 3
[51] Int. Cl.......................................F16d 31/06, F16h 41/02
[58] Field of Search............................................60/54, DIG. 3

[56] References Cited

UNITED STATES PATENTS

2,911,786  11/1959  Kelley......................................60/54 X
3,347,042  10/1967  Horsch......................................60/54 X Primary Examiner—Edgar W. Geoghegan
Attorney—McCarthy, Depaoli & O'Brien

[57] ABSTRACT

An automotive power transmission lubricating circuit which is supplied with a lubricating fluid from an oil pump delivering a pressurized fluid for operating the transmission, the lubricating fluid being drawn to the lubricating circuit from a passage upstream of a torque converter, whereby the lubricating circuit can be supplied with a lubricating fluid at any desired flow rate which is not influenced by the operation of the torque converter throughout different operations of the transmission.

3 Claims, 1 Drawing Figure

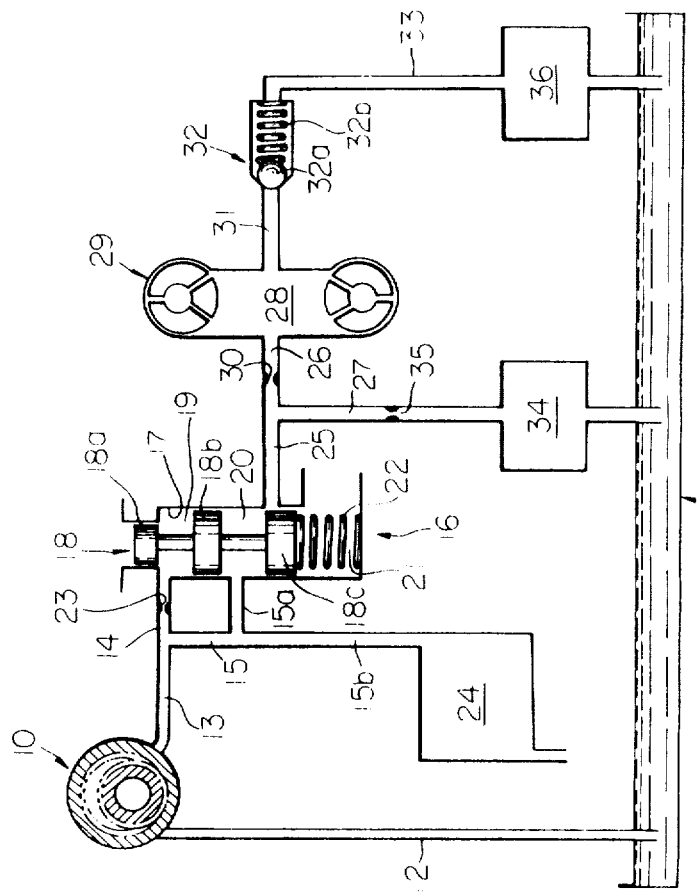

LUBRICATING CIRCUIT OF AN AUTOMOTIVE POWER TRANSMISSION

This invention relates to an automotive power transmission having a torque converter and, more particularly, to a lubricating circuit of an automotive power transmission with a torque converter.

An automotive power transmission is usually provided with a lubricating circuit for lubricating the gear train of the power transmission. The lubricating circuit is positioned posterior to a torque converter and receives a lubricating fluid from a source of pressurized fluid through the torque converter. The flow rate of the fluid to the lubricating circuit thus depends upon the quantity of the fluid drained from the torque converter through a relief valve intervening between the torque converter and the lubricating circuit. It therefore sometimes happens that, in the event the gear train of the transmission demands a supply of an increased amount of lubricating fluid so as to be protected from being overheated as when the engine is driven at an increased speed, such demand can not be fully met with because of the restricted flow rate of the fluid from the torque converter. If arrangements are made to increase the flow rate of the fluid to be supplied to the lubricating circuit, then it is necessary that the fluid pressure in the torque converter be increased beyond a level which is proper to assure the satisfactory operation of the torque converter. If the pressure of the fluid in the housing of the torque converter is increased beyond such level, the torque converter housing is forced to expand so as to cause the pump, turbine and stator thereof to be heated and deformed. The vanes mounted in the pump and turbine are thus liable to strike against each other and are damaged or removed therefrom.

An object of this invention is therefore to provide an improved power transmission lubricating circuit which is capable of being supplied with a sufficient amount of lubricating fluid throughout different operations of the power transmission without increasing the internal pressure of the torque converter whereby the gear train of the transmission can be at all times lubricated satisfactorily.

A preferred embodiment of the lubricating circuit according to this invention is illustrated in the accompanying drawing, wherein elements are all of known construction and as such details thereof are not shown.

The transmission lubricating circuit forms part of the fluid pressure circuit of the power transmission as customary. The fluid pressure circuit, which is merely partially and schematically illustrated, has a source of pressurized fluid or an oil pump 10. The oil pump 10 sucks in a working fluid from an oil pump 11 through a suction passage 12. The pressurized fluid produced in the oil pump 10 is supplied to the fluid pressure and transmission lubricating circuits through a discharge passage 13 leading from an outlet port (not shown) of the oil pump. The discharge passage 13 diverges into first and second branch passages 14 and 15, respectively, so as to control a pressure regulating valve 16. The pressure regulating valve 16 has a generally cylindrical bore 17 having axially slidably accommodated therein a valve spool 18. The valve spool 18 includes first, second and third lands 18a, 18b and 18c, respectively, which are spaced from each other. The first and second lands 18a and 18b, respectively, define therebetween a first chamber 19 which communicates with the first branch passage 14 while the second and third lands 18b and 18c, respectively, define therebetween a second chamber 20 which communicates with the second branch passage 15 through a sub-branch passage 15a. Behind the land 18c of the valve spool 18 is defined a third chamber 21 which communicates with the oil sump 11 through a not shown passage. The first land 18a is smaller in outside diameter than the second and third lands 18b and 18c, respectively, which are substantially identical in outside diameter to each other. A compression spring 22 having a selected spring constant is mounted in the third chamber 21, biasing the valve spool 18 upwardly as viewed in the drawing. The first branch passage 14 has provided therein a calibrated restriction or orifice 23 thereby to restrict the flow of the pressurized fluid through the branch passage 14.

The branch passage 15 communicates not only with the sub-branch passage 15a but with a line pressure passage 15b which lead to a transmission control fluid pressure circuit 24, as customary.

The second chamber 20 of the pressure regulating valve 16 communicates with a torque converter fluid passage 25 which diverges into first and second branch passages 26 and 27, respectively. The first branch passage 26 communicates with a housing 28 of a torque converter which is generally represented by a reference numeral 29. To restrict the flow of the fluid into the torque converter housing 28, a calibrated restriction or orifice 30 is mounted in the first branch passage 26. The torque converter housing 28 communicates with the oil sump 11 through a discharge passage 31, a relief valve 32 and a drain passage 33. The relief valve 32 is shown to include a ball check valve 32a and a compression spring 32b biasing the ball check valve 32a to be held in a position to block the fluid communication between the passages 31 and 33 as illustrated.

The second branch passage 27 diverging from the torque converter fluid passage 25 communicates with a transmission lubricating circuit which is generally represented by a reference numeral 34 and which per se is known. The lubricating circuit 34 communicates downstream with the oil sump 11 whereby the lubricating fluid used therein is returned to the oil sump. A calibrated restriction or orifice 35 may be provided in the second branch passage 27 thereby to regulate the flow of the lubricating fluid to the lubricating circuit 34.

If, now, the fluid pressure in the torque converter is lower than a certain level the torque converter will tend to invite a cavitation and if higher than a certain level then the torque converter housing expands as previously discussed. The fluid pressure in the torque converter 29 is therefore regulated by means of the orifice 30 and the relief valve 32. The orifice 30 is so calibrated as to pass the fluid to the torque converter 29 at a rate optimum for the operation of the torque converter which, therefore, is protected from being expanded and subjected to cavitation. The fluid pressure in the passage 31 can be maintained within an optimum range by selecting thespherical area of the ball check valve 32a to be subjected to the pressure in the passage 31 and the spring constant of the compression spring 32b. It is, in this instance, important that the difference between the pressures in the passages 25 and 31 be reduced to a minimum for the purpose of maintaining the torque converter 29 at all times in a sound state. For this reason, the relief valve 32 should preferably be arranged to minimize the flow of the fluid through the passage 31.

When, in operation, the pressurized fluid is supplied from the oil pump 10 through the discharge passage 13, the fluid is directed, on one hand, into the first chamber 19 through the passage 14 and, on the other hand, into the second chamber 20 through the passages 15 and 15a. Since the second and third lands 18b and 18c, respectively, are identical in outside diameter, the fluid pressure directed into the second chamber acts equally on the lands 18b and 18c. The first land 18a, however, is smaller in diameter than the second land 18b so that the land 18b is acted upon more by the pressure drawn into the first chamber 19 than the land 18a. The valve spool 18 is thus moved toward the third chamber 21 against the action of the compression spring 22. The valve spool 18 is held stationary when the pressure urging the valve spool toward the third chamber 21 is balanced with the opposing effort by the compression spring 22. When the valve spool 18 is held in this position, the second chamber 20 is permitted to communicate with the torque converter fluid passage 25. The fluid in the discharge passage 13 is directed to the torque converter fluid passage 25 through the second chamber 20 of the bore 17. This causes the pressure in the first chamber 19 to lower so that the valve spool 18 is caused to move away from the third chamber 21 by the action of the compression spring 22. The valve spool 18 becomes stationary in another position in which the communication between the second chamber 20 and the torque converter fluid passage 25 is interrupted as illustrated. The fluid pressure to be directed to the transmission control fluid pressure circuit 24 through the passage 15b is in this manner regulated within a given range.

Where, on the other hand, the fluid supplied from the oil pump 10 is increased beyond such given range, the valve spool 18 which has been in a position to provide communication between the second chamber 20 and the torque converter fluid passage 25 is further moved toward the third chamber 21 against the action of the compression spring 22, until the second chamber 20 is permitted to communicate with the third chamber. The fluid in the discharge passage 13 is not corrected to the torque converter fluid passage 25 through the second chamber 20 but drained into the oil sump 11 through the second and third chambers 20 and 21, respectively. The excessively high fluid pressure is relieved in this manner so that the transmission control fluid pressure circuit 24 receives a pressure falling within the given range.

The fluid directed to the torque converter fluid passage 25 is led to the branch passages 26 and 27. The fluid flowing through the branch passage 26 is restricted by the orifice 30 and supplied to the torque converter 29. The excess fluid in the torque converter housing 28 is fed back to the oil sump 11 through the discharge passage 31, relief valve 32 and drain passage 36. The fluid flowing into the other branch passage 27 is restricted by the orifice 35 and directed to the transmission lubricating circuit 34. Since, thus, the fluid flowing through the branch passage 27 is used for lubricating purposes, the orifice 35, where provided, should be so calibrated as to provided a relatively high flow rate. This orifice 35 serves to prevent the torque converter working fluid from decreasing excessively. The orifice 35 may be dispensed with if desired, in which instance the flow rate of the fluid through the passage 27 will be restricted by the resistance of the inside wall surface of the passage 27.

It will now be appreciated that, since the lubricating supply passage 27 leads from the torque converter fluid passage 25 upstream of the torque converter 29, the transmission lubricating fluid circuit 34 can receive the lubricating fluid at any desired rate throughout different operations of the transmission.

If desired, an auxiliary lubricating fluid circuit may be provided in the drain passage 33 as indicated by reference numeral 36, supplying the fluid drained off the torque converter 29 to the transmission gear train.

What is claimed is:

1. In an automotive power transmission fluid circuit including a source of a pressurized fluid, a transmission fluid control circuit communicating with said source of the pressurized fluid, a fluid pressure regulating valve for maintaining within a predetermined range the fluid pressure to be directed to said transmission fluid control circuit, a torque converter working fluid passage selectively communicating with said source through said regulating valve, said regulating valve being normally in a position to block the fluid communication between said source and said torque converter working fluid passage and being moved, when the fluid pressure upstream of said regulating valve increases beyond a predetermined level, to a position in which said torque converter working fluid passage is permitted to communicate with said source through said regulating valve, a branch passage leading from said torque converter working fluid passage and provided with a calibrated flow restriction, and a torque converter operating by the fluid supplied thereto through said branch passage and having a relief valve for regulating the flow of the fluid drained from said torque converter, the improvement comprising a transmission lubricating fluid circuit which communicates with said torque converter working fluid passage through a lubricating fluid passage leading from said torque converter working fluid circuit upstream of said torque converter.

2. The improvement according to claim 1, further comprising an auxiliary transmission lubricating fluid circuit which communicates with said relief valve whereby the fluid drained from said torque converter is supplied to said auxiliary transmission lubricating fluid circuit.

3. The improvement according to claim 1, wherein said lubricating fluid supply passage is provided with a calibrated flow restriction.

* * * * *